Jan 27, 1925.  1,524,221

G. M. THOMPSON

BARREL SUPPORT

Filed Feb. 11, 1924

G. M. Thompson
INVENTOR.

BY
ATTORNEYS.

Patented Jan. 27, 1925.

1,524,221

UNITED STATES PATENT OFFICE.

GEORGE M. THOMPSON, OF AVON PARK, FLORIDA.

BARREL SUPPORT.

Application filed February 11, 1924. Serial No. 692,084.

*To all whom it may concern:*

Be it known that I, GEORGE M. THOMPSON, a citizen of the United States, residing at Avon Park, in the county of Highlands and State of Florida, have invented certain new and useful Improvements in Barrel Supports, of which the following is a specification.

This invention relates to an improvement in barrel supports and has more particular reference to an article of this character wherein the barrel may be tilted as desired through the medium of the support which is in the form of a cradle, the primary object of the invention residing in the provision of such a barrel support wherein barrels of different sizes may be readily associated therewith and wherein the same may be maintained in any desired tilted position.

With the foregoing and other objects in view, as the nature of the invention will be better understood, the same comprises the novel form, combination and arrangement of parts hereinafter more fully described, shown in the accompanying drawing and claimed:

In the drawing, wherein like reference characters indicate corresponding parts throughout the several views.

Figure 1:
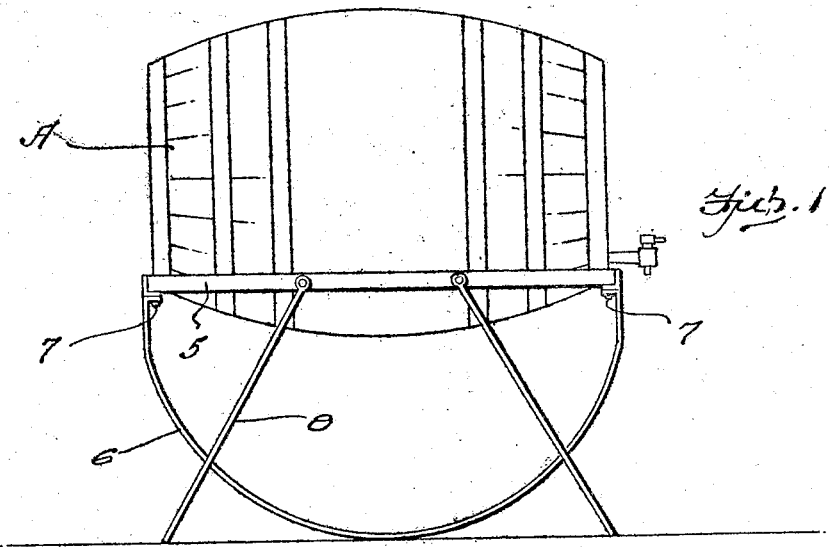
Figure 1 is a side elevational view of a barrel support constructed in accordance with the present invention, the same being shown as actually in use.

Having particular reference to the drawing, my novel barrel support includes a cradle structure consisting of a substantially rectangular shaped barrel receiving frame 5 that is formed from L-shaped angle bars as clearly shown in the views and within which is to be set the barrel indicated A.

At opposite longitudinal sides of this frame 5 are rockers 6 of substantially semi-circular shapes, the ends of which are bent laterally inwardly at 7 for allowing the same to be rigidly secured to the opposite ends of the frame 5.

Figure 2:
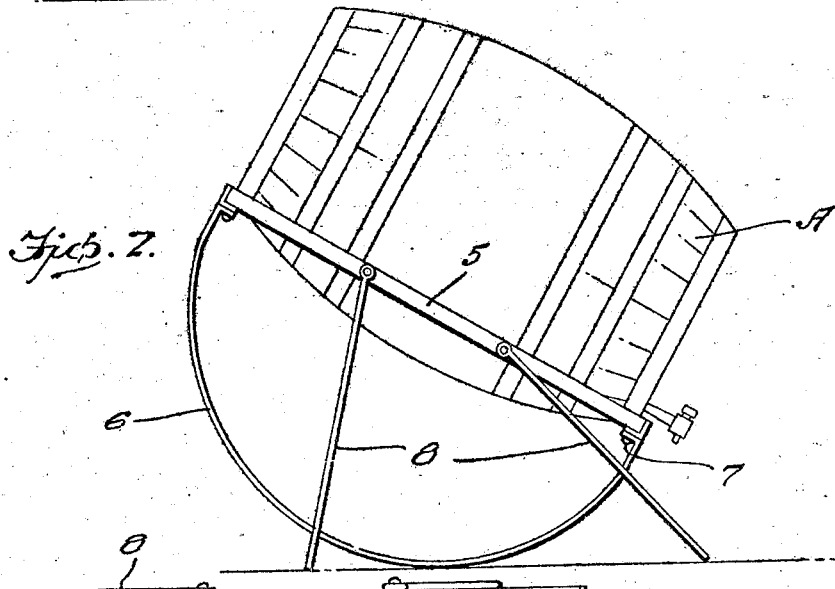
Figure 2 is a view similar to Figure 1, the barrel being shown as maintained through the medium of the present support in a desired tilted position.
Figure 3:
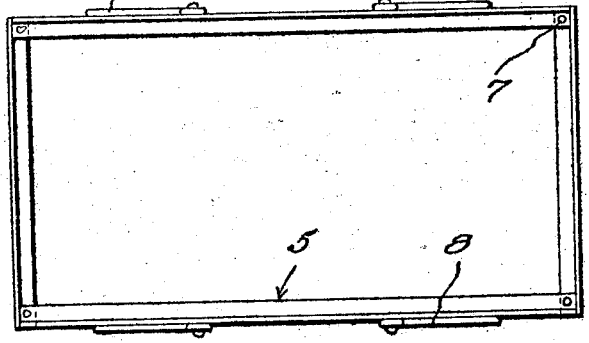
Figure 3 is a top plan view of the support per se.

Carried by the side bars of the frame 5 are pairs of loosely pivoted spaced legs or props 8 that are of a length greater than the height of said cradle and that are adapted to be positioned in the manner shown in Figure 1 for preventing a rocking movement of the cradle and a maintenance of the barrel A in a true horizontal position, it being obvious however, that these rods 8 upon opposite sides of the frame 5 of the cradle may be positioned in a manner as shown in Figure 2 for maintaining the barrel in a tilted position as shown in said figure, or whenever desired, these rods may be swung entirely upwardly from the ground for allowing the barrel to be rocked back and forth for thoroughly mixing the contents thereof.

In placing the barrel A within the cradle the same is laid in a vertical position and then slightly tilted, after which the frame 5 of the cradle may be placed over one side thereof, after which by pushing upon the barrel, the frame will rock and consequently receive the barrel in a manner as shown in the figures. It will thus be seen that I have provided a highly novel and useful form of barrel support and one that will meet with all of the requirements for a successful commercial use.

Having thus described my invention, what I claim as new and desire to secure by Letters Patent is:

1. A barrel support comprising a cradle upon which the barrel is adapted to rest, and pairs of props pivotally connected at their upper ends to the cradle structure, the props of each pair being disposed opposite each other and the pivotal connections of each pair being disposed on opposite sides of the transverse center of said cradle structure, said props being of a length greater than the height of said cradle structure to permit them to be angled with respect to each other for supporting the barrel in a horizontal position.

2. A barrel support comprising a cradle structure composed of an elongated frame made up of a plurality of connected angle irons, and a pair of rockers having their opposite ends inturned and secured to said frame at the corners of the latter, and a pair of supporting props located on one side of said frame, said props being pivoted to one of the side bars of the frame on opposite sides of the longitudinal center of the latter, and said props being of a length greater than the height of said rockers.

In testimony whereof I affix my signature.

GEORGE M. THOMPSON.